US005918405A

United States Patent [19]

Marusak et al.

[11] Patent Number: 5,918,405
[45] Date of Patent: *Jul. 6, 1999

[54] MODULAR FISHING LURE

[75] Inventors: Steve A. Marusak; David L. Luikart, Jr.; Enrique Abundis Rodriguez, all of New Port Richey; Anthony M. Stubbs, Port Richey; Stanley Wrucha, Clearwater, all of Fla.

[73] Assignee: Cotee Industries, Inc., Port Richey, Fla.

[ * ] Notice: This patent is subject to a terminal disclaimer.

[21] Appl. No.: 08/898,767

[22] Filed: Jul. 23, 1997

[51] Int. Cl.⁶ .................................................. A01K 85/00
[52] U.S. Cl. ................................... 43/42.09; 43/42.34
[58] Field of Search .................................... 43/42.1, 17.6, 43/42.06, 42.09, 42.34, 42.26, 42.31, 42.24, 42, 42.25, 42.28

[56] References Cited

U.S. PATENT DOCUMENTS

| | | | |
|---|---|---|---|
| 3,218,750 | 11/1965 | LEwin | 43/42.39 |
| 3,359,674 | 12/1967 | Strumor | 43/42.06 |
| 3,445,953 | 5/1969 | Dailey | 43/42.06 |
| 3,492,754 | 2/1970 | Jentzsch | 43/42.09 |
| 3,497,987 | 3/1970 | Perrin | 43/42.28 |
| 3,611,614 | 10/1971 | Ward | 43/42.32 |
| 3,621,600 | 11/1971 | Dworski | 43/42.39 |
| 3,680,250 | 8/1972 | Hetrick | 43/17.6 |
| 3,708,903 | 1/1973 | Bercz etal. | 43/17.6 |
| 3,855,722 | 12/1974 | Moore | 43/42.34 |
| 3,881,272 | 5/1975 | Parker | 43/42.34 |
| 3,883,979 | 5/1975 | Williams, Jr. | 43/42.09 |
| 3,909,974 | 10/1975 | Kent | 43/42.31 |
| 4,186,510 | 2/1980 | Kimerer, Jr. | 43/42.25 |
| 4,367,607 | 1/1983 | Hedman | 43/42.1 |
| 4,432,156 | 2/1984 | Gowing | 43/42.31 |
| 4,573,283 | 3/1986 | Pippert | 43/42.09 |
| 4,587,839 | 5/1986 | Mattison | 43/17.6 |
| 4,589,221 | 5/1986 | Mattison | 43/17.6 |
| 4,610,103 | 9/1986 | Steinman | 43/17.6 |
| 4,638,584 | 1/1987 | Lindsay | 43/17.6 |
| 4,693,032 | 9/1987 | Mattison | 43/17.6 |
| 4,697,378 | 10/1987 | Tunstall | 43/42.09 |
| 4,709,499 | 12/1987 | Ottaviano | 43/17.6 |
| 4,712,326 | 12/1987 | Hoover et al. | 43/42.31 |
| 4,751,788 | 6/1988 | Mattison | 43/17.6 |
| 4,785,569 | 11/1988 | Thomas, Jr. | 43/42.31 |
| 4,787,167 | 11/1988 | Wroclawski | 43/17.6 |
| 4,790,100 | 12/1988 | Green, Sr. | 43/42.26 |
| 4,791,750 | 12/1988 | Gammill | 43/42.31 |
| 4,799,327 | 1/1989 | Treon | 43/17.6 |
| 4,912,871 | 4/1990 | Brady | 43/42.26 |
| 4,918,854 | 4/1990 | Webre, Jr. | 43/42.31 |
| 5,038,513 | 8/1991 | Hardin | 43/42.31 |
| 5,142,811 | 9/1992 | Freeman | 43/42.53 |
| 5,148,622 | 9/1992 | Blair | 43/42 |
| 5,155,947 | 10/1992 | Rivard | 43/42.06 |
| 5,170,579 | 12/1992 | Hollinger | 43/42.06 |
| 5,182,875 | 2/1993 | Righetti | 43/42.24 |
| 5,209,007 | 5/1993 | Southerland, Jr. | 43/42.09 |
| 5,224,285 | 7/1993 | Kamin et al. | 43/42.06 |
| 5,237,771 | 8/1993 | Watson et al. | 43/42.31 |
| 5,337,508 | 8/1994 | Pfeiffer | 43/42.03 |
| 5,537,770 | 7/1996 | Storm et al. | 43/42.22 |
| 5,564,220 | 10/1996 | Blicha | 43/42.32 |
| 5,566,496 | 10/1996 | Rutherford et al. | 43/42.09 |
| 5,586,405 | 12/1996 | Fike | 43/42.31 |
| 5,588,246 | 12/1996 | Hill | 43/42.06 |
| 5,630,289 | 5/1997 | Dotson | 43/42.09 |

OTHER PUBLICATIONS

Cabela's Annual Spring Catalog, 1995, p. 49.

*Primary Examiner*—Michael J. Carone
*Assistant Examiner*—Fredrick T. French, III
*Attorney, Agent, or Firm*—Zarley, McKee, Thomite, Voorhees & Sease

[57] ABSTRACT

The fishing lure of the present invention includes a frame and a plurality of soft outer bodies. The appearance of the lure can be altered by interchanging the various bodies. The bodies are removably secured to the frame by eyes which extend from the frame and which can be inserted into eye sockets formed in the soft outer bodies. In this way, the soft outer bodies can be interchanged without untying the fishing line from the frame. The eyes are also removably secured from the frame so that they may be interchanged.

10 Claims, 4 Drawing Sheets

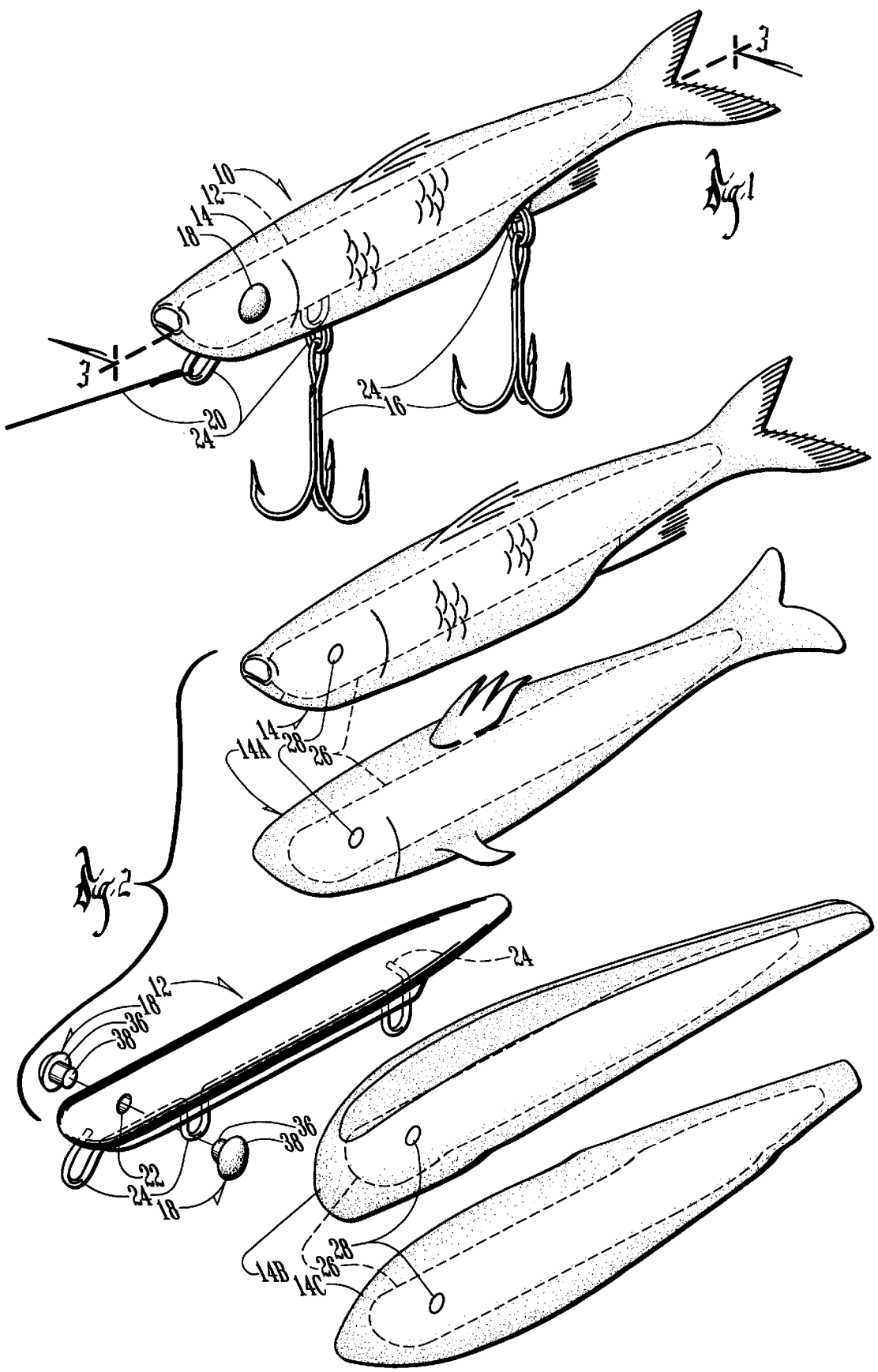

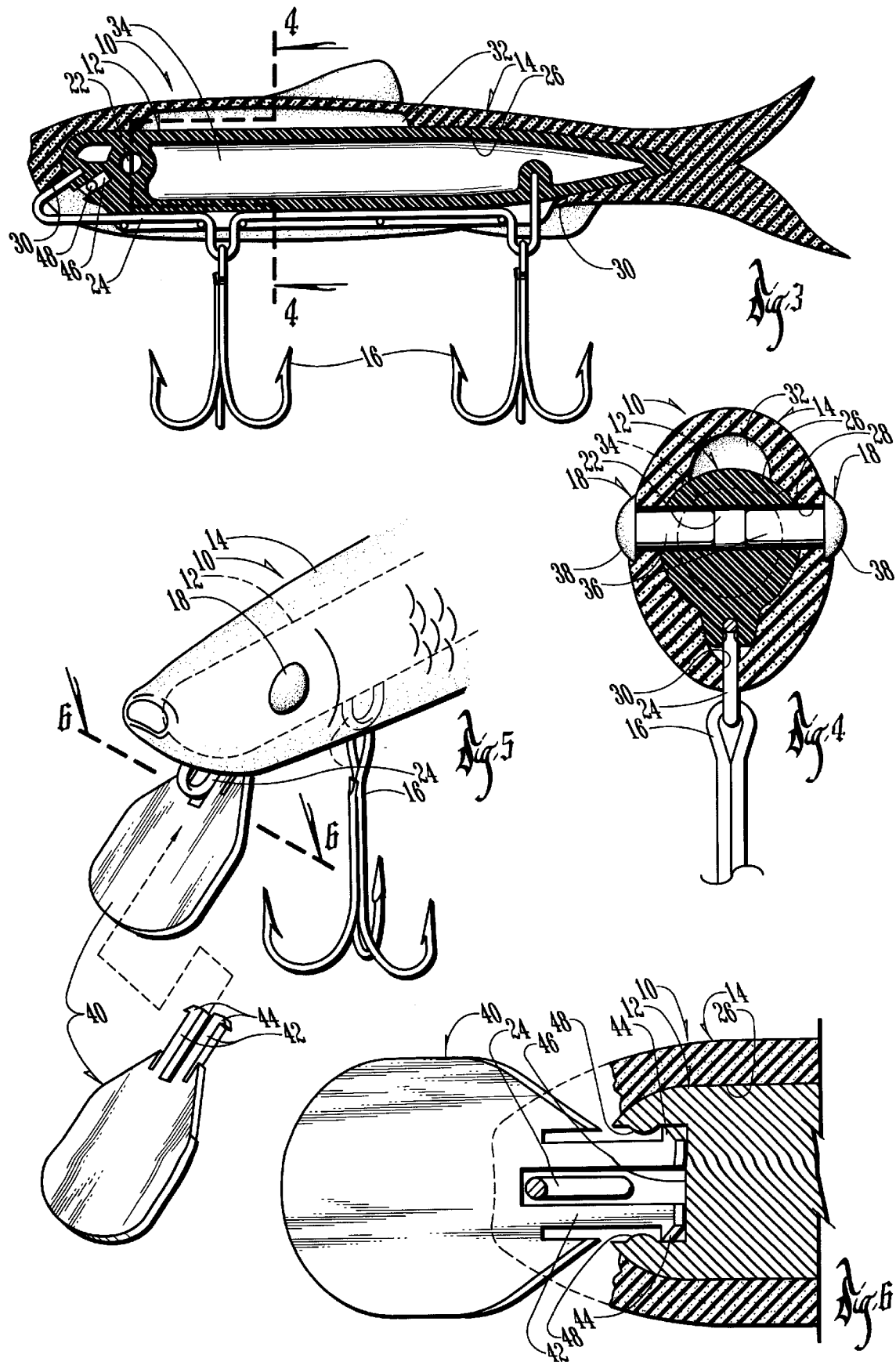

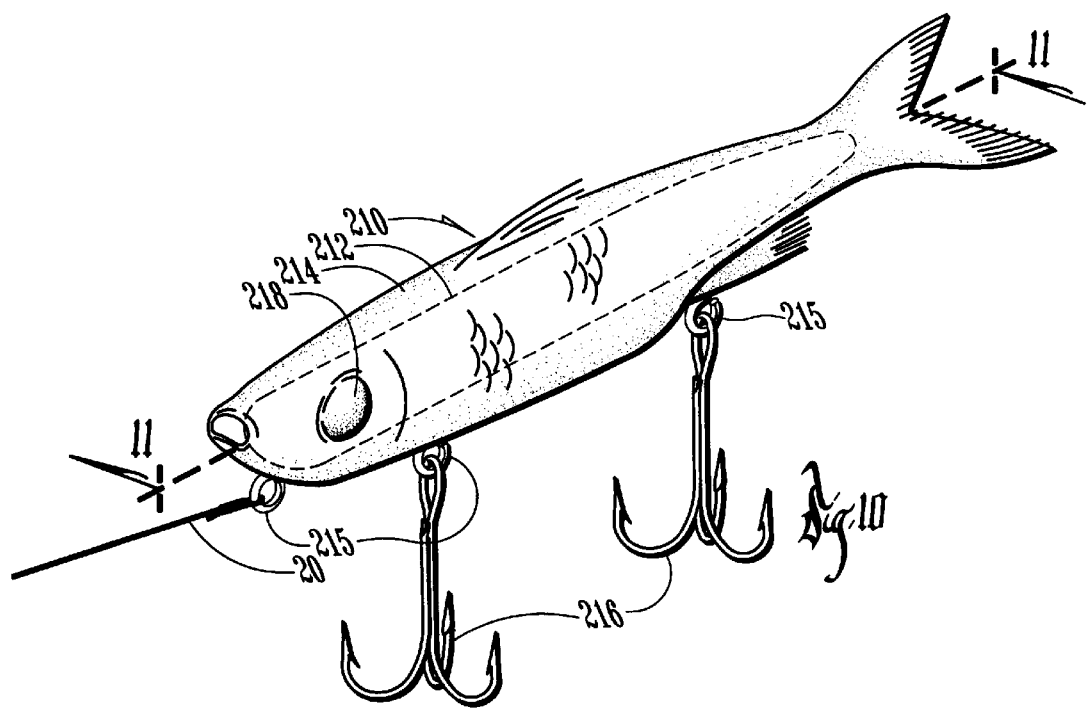
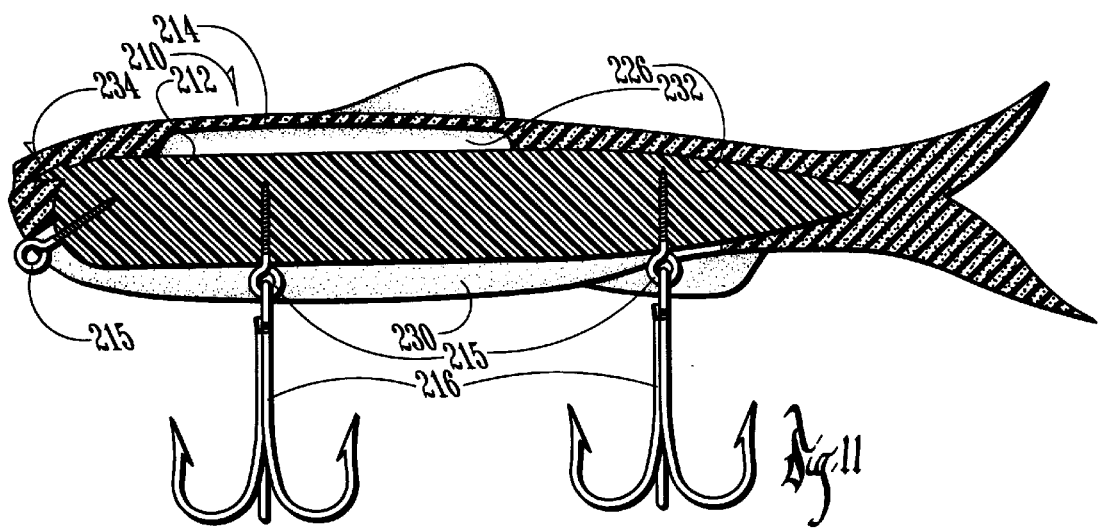
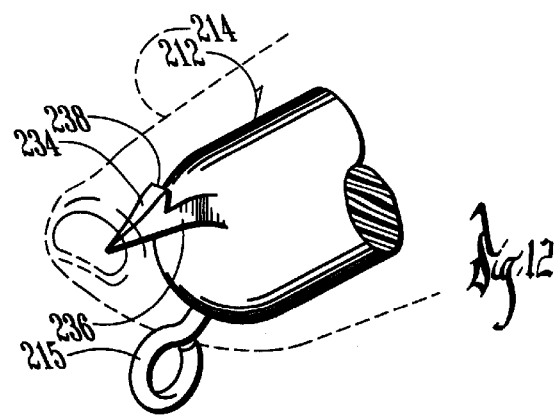

MODULAR FISHING LURE

BACKGROUND OF THE INVENTION

1. Field of the Invention

The present invention relates to fishing lures. More particularly, though not exclusively, the present invention relates to an apparatus and method for improving the effectiveness and flexibility of fishing lures.

2. Problems in the Art

Typical artificial fishing lures come in many shapes and forms, but are all designed to simulate natural prey or food or to otherwise attract fish. Conventional fishing lures include many different types. In addition, among each type of lure, the lures come in various colors and shapes and with various alternate features. In order for fishermen to have a wide variety of lures for fishing for various types of fish under various conditions, a fisherman will fill a tackle box with a large number of lures, each being designed for a specific purpose. Fishermen typically include similar lures having varying colors in a tacklebox so that they can try the various different types of lures in various colors to determine what the fish are biting on. As a result, a typical tackle box will be filled with dozens of various fishing lures.

A conventional fishing lure is attached to the fishing line in a number of ways. Most commonly, a fisherman will simply tie the fishing line directly to the fishing lure. In order to change to a different type of lure while fishing, the fisherman will cut the line and then tie another lure onto the line. This is both time consuming and inconvenient. Another method of attaching a fishing lure to a fishing line is to connect a wire leader to the fishing line. A clip can be connected to the leader and clipped to the desired fishing lure. With this configuration, in order to change lures, the fisherman will unclip the present lure and clip on a different lure. One problem with leader lines is that they are typically more visible than the fishing line and may deter fish from the fishing lure. In addition, the clip itself may be visible to the fish which is undesirable for obvious reasons.

While using prior art fishing lures, a fisherman may change lures over and over in order to select the optimal lure for the conditions at the particular time. For example, the fisherman may interchange floating, sinking, etc. lures to determine what is working best at that time. In addition, the fisherman may interchange various colors, scent emitting materials, etc. in order to further determine what is most effective at any particular time. As a result, a fisherman will repeatedly cut the line and tie on another lure. Not only is this time consuming and inconvenient, but also requires that the fisherman have a tacklebox full of dozens of different types and colors of lures.

FEATURES OF THE INVENTION

A general feature of the present invention is the provision of a method and apparatus for providing fishing lures which overcome problems found in the prior art.

A further feature of the present invention is the provision of a method and apparatus for providing a modular fishing lure which allows a fisherman to interchange various components of the fishing lure.

A further feature of the present invention is the provision of a method and apparatus for providing a modular fishing lure which allows the use of multiple soft outer bodies on a single frame.

A further feature of the present invention is the provision of a method and apparatus for providing a modular fishing lure in which a soft outer body can be removably secured to a frame by the use of eyes extending from the frame through holes formed in the soft outer body.

Further features, objects and advantages of the present invention include:

A method and apparatus for providing a modular fishing lure which allows the user to change features of lure without untying the fishing line.

A method and apparatus for providing a modular fishing lure which allows the use of interchangeable eyes.

A method and apparatus for providing a modular fishing lure which allows the use of a plurality of soft outer bodies, each having differing physical characteristics.

A method and apparatus for providing a modular fishing lure which allows for the optional use of a lip.

A method and apparatus for providing a modular fishing lure including crank baits.

A method and apparatus for providing a modular fishing lure including jerk baits.

A method and apparatus for providing a modular fishing lure with sound or scent chambers.

These as well as other features, objects and advantages of the present invention will become apparent from the following specification and claims.

SUMMARY OF THE INVENTION

The fishing lure of the present invention is comprised of a frame including at least one protrusion extending from the frame. A soft outer body is adapted to fit over at least a portion of the frame and is secured to the frame by the protrusion extending through an opening formed in the soft outer body. The protrusion may optionally be comprised of a pair of eyes extending from the frame. The soft outer body is adapted to fit over the frame with the eyes extending through the soft outer body to secure the body to the frame and to give the appearance of eyes on the soft outer body.

BRIEF DESCRIPTION OF THE DRAWINGS

FIG. 1 is a perspective view of a modular fishing lure according to the present invention.

FIG. 2 is an exploded view of a modular fishing lure of the present invention including several alternate soft outer bodies.

FIG. 3 is a sectional view taken along line 3—3 of FIG. 1.

FIG. 4 is an enlarged sectional view taken along line 4—4 of FIG. 3.

FIG. 5 is an enlarged partial view of the modular fishing lure shown in FIG. 1 with an optional lip insert.

FIG. 6 is a partial sectional view taken along line 6—6 of FIG. 5.

FIG. 10 is a perspective view of an alternate embodiment of a modular fishing lure according to the present invention.

FIG. 11 is a sectional view taken along line 11—11 of FIG. 10.

FIG. 12 is an enlarged partial view of the modular fishing lure shown in FIG. 10.

DETAILED DESCRIPTION OF THE PREFERRED EMBODIMENT

Figure 7:
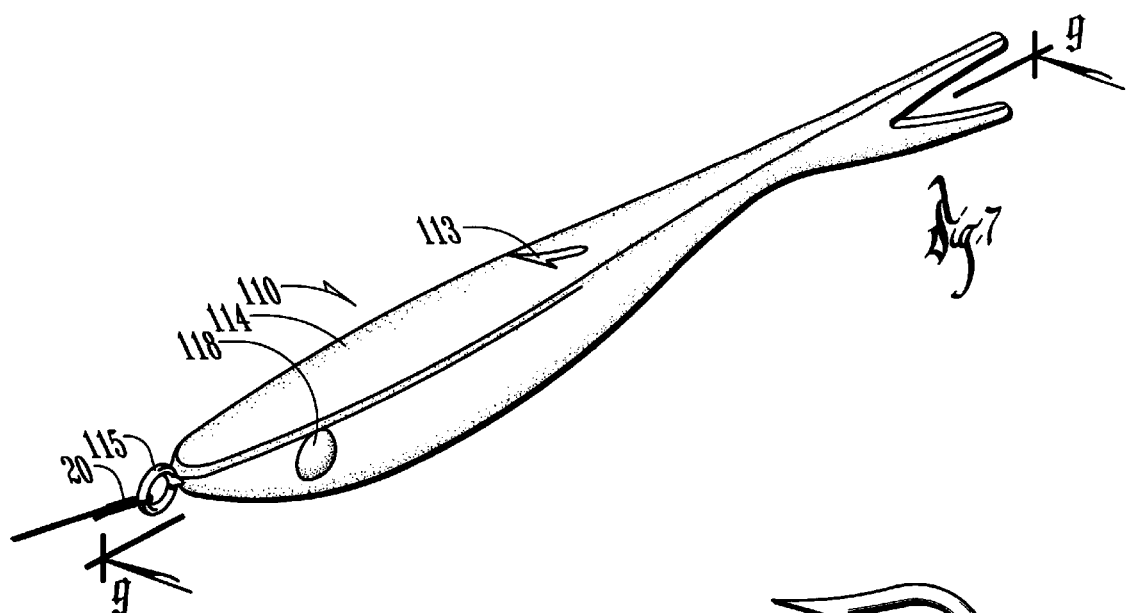
FIG. 7 is a perspective view of an alternative embodiment of the present invention.

The present invention will be described as it applies to its preferred embodiment. It is not intended that the present invention be limited to the described embodiment. It is intended that the invention cover all alternatives, modifications, and equivalencies which may be included within the spirit and scope of the invention.

FIG. 1 shows a modular fishing lure 10 of the present invention. As shown, the lure 10 includes a plastic hollow frame 12 surrounded by a soft outer body 14. The body 14 has a shape and color which is attractive to fish, in this example, the soft outer body 14 resembles a minnow. Attached to the frame 12 are a pair of treble hooks 16. Also attached to the frame 12 are a pair of removable eyes 18 which extend through the body 14. The fishing lure 10 can be tied to a conventional fishing line 20 as shown. The fishing lure 10 crosses the bridge between hard treble-hook baits and soft plastic baits.

FIG. 2 shows an exploded view of the frame 12 and of four alternative bodies 14–14C. As shown, the frame 12 includes a circular opening 22 which is adapted to receive the removable eyes 18 as shown. The eyes 18 may be secured to the frame 12 by a frictional fit or by any other adequate means. The frame 12 also includes a wire form 24 which is comprised of a single piece of wire formed partially within the frame 12 as shown. The wire form 24 provides a tie eye (loop) for securing the fishing line 20 to the lure 10 as well as hook hangers for attaching the hooks 16 to the lure 10.

As shown in FIG. 2, various styles of bodies 14 can be used with the present invention. Bodies 14 and 14A shown in FIG. 2 are shaped to provide the appearance of a fish having fins and a tail. Bodies 14B and 14C are designed to appear like some other natural prey or food attractive to fish. By selecting between the various bodies, the fisherman can choose any available body style for the lure 10. Of course, the bodies 14–14C are only examples of possible body types. Other body styles could include all plugs, shad/sardine style bait, mullet style bait, offshore/blue water/muskie style bait, etc. The bodies may be colored by metal specs, laminates, etc. or could even be impregnated with a scent material. Alternatively, the bodies could be manufactured clear so that the fisherman could color the bodies with dyes, markers, etc. There are an infinite number of possible body types and colors that could be used with the present invention. In addition, the frame 12 can be colored or foil stamped to provide a desired appearance. With these types of frames 12, the bodies 14 are preferably clear or at least translucent.

Similarly, various styles of eyes 18 can also be used. For example, eyes 18 can come in an infinite number of colors or can be made with a foil stamping technique. In addition, the eyes 18 need not be removable. The eyes 18 could be a permanent part of the frame 12. The eyes 18 could also be made of metal to add weight to the lure.

The soft outer body 14 includes a cavity 26 formed therein which has generally the same shape as the outer surface of the frame 12. In addition, a slot or slit 30 is formed on the underside of the body 14 so that the body 14 can be inserted over the frame 12. The slit 30 is preferably 1/32 inches in width. To secure the body 14 to the frame 12, the eyes 18 (which are inserted into the openings 22 prior to inserting the body 14 over the frame 12) are pressed through the holes 28 formed in the soft outer body 14 so that the eyes 18 actually secure the body 14 to the frame 12. As shown, the eyes 18 are comprised of a shaft portion 36 and an enlarged head portion 38. When inserting the body 14 onto the frame 12, the material comprising the body 14 has enough resiliency that the holes 28 will stretch over the head portion 38 of the eyes and will come into contact with the shaft portion 36. In this way, the head portion 38 will prevent the body 14 from becoming unsecured from the frame 12. Alternatively, the body 14 could be inserted over the frame 12 and then the eyes 18 inserted into the frame 12.

An alternative method of securing the body 14 to the frame 12 is by the use of any protrusion extending from the frame 12, whether or not the protrusion forms eyes. For example, one or more protrusions could be extended from the frame 12 in the front, back, sides, etc. of the frame 12. The soft outer body 14 could then be secured to the protrusions in the same manor as with the eyes 18 described above.

FIG. 3 is a cross section of the fishing lure 10 including the frame 12 and soft outer body 14. As shown, the soft outer body 14 closely conforms to the outer surfaces of the frame 12. The slot 30, as shown, extends from near the chin of the body 14 to a point near the tail of the body. The length of the slot 30 is also defined by the wire form 24 as shown. One optional feature of the present invention can also be seen in FIG. 3. As shown, a hollow chamber 32 may be formed in the soft outer body 14. In this way, the chamber 32 is surrounded partially by the soft outer body 14 and partially by the frame 12. If desired, a fisherman may insert a scent emitting material or light emitting material into the chamber 32. A weight can also be inserted into the chamber 32.

FIG. 3 also shows an internal chamber 34 formed within the frame 12. Preferably, the frame 12 is comprised of a hollow plastic member. If desired, rattle members such as plastic, metal, ceramic, etc. balls may be placed within the internal chamber 34 to create noise which may be attractive to fish. The rattle members also can be used to add weight to change the buoyancy of the lure.

FIG. 4 shows a cross sectional view of the frame 12, body 14, wire form 24, and eyes 18. As shown, the soft outer body 14 closely conforms to the frame 12. FIG. 4 also illustrates the hollow chamber 32 formed in the body 14. FIG. 4 also shows the opening 22 formed in the frame 12. As shown, the shaft portion 36 of each of the eyes 18 extends partially into the frame 12 but does not extend entirely within the frame 12. In this way, there is a space between the head portion 38 of the eyes 18 and the outer surface of the frame 12. This space is roughly the same as the thickness of the soft outer body 14 in the proximity of the holes 28.

FIGS. 5 and 6 show an optional feature of the present invention. FIG. 5 is a partial view of the fishing lure 10 with a lip 40 inserted into the frame 12. The lip 40 preferably includes a body portion with two opposing legs 42 having protrusions 44 formed near their ends. The frame 12 includes a cavity 46 which is adapted to receive the legs 42 of the lip 40 (FIG. 6). The cavity 46 also includes fingers 48 which are adapted to engage the protrusions 44 on the legs 42 to secure the lip 40 in place. The lip 40 may also have contoured or curved surface, or could be flat, for example.

Figure 8:
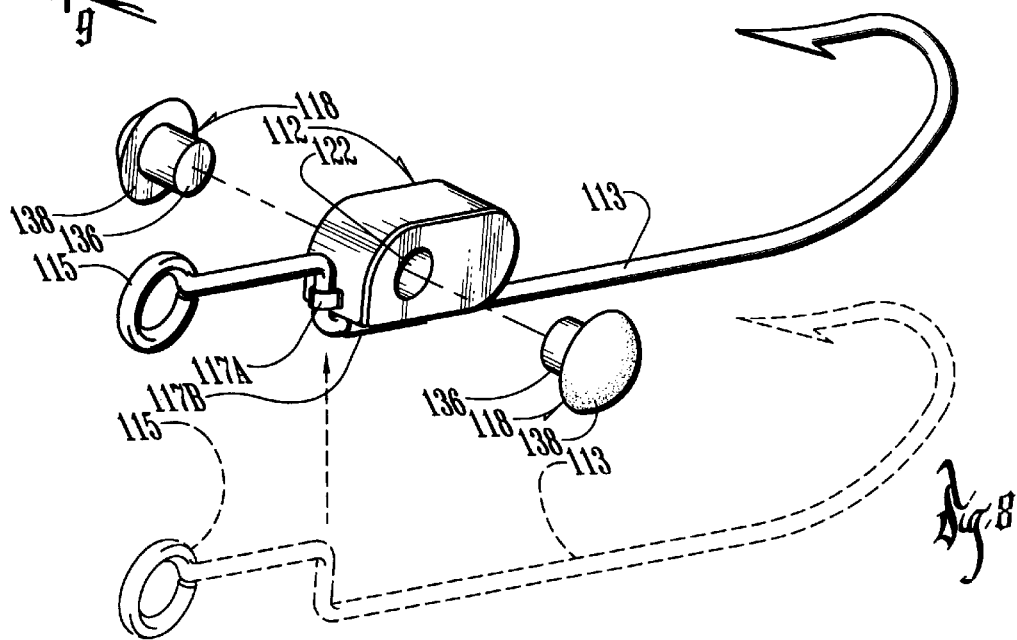
FIG. 8 is an exploded perspective view of the frame of the modular fishing lure shown in FIG. 7.
Figure 9:
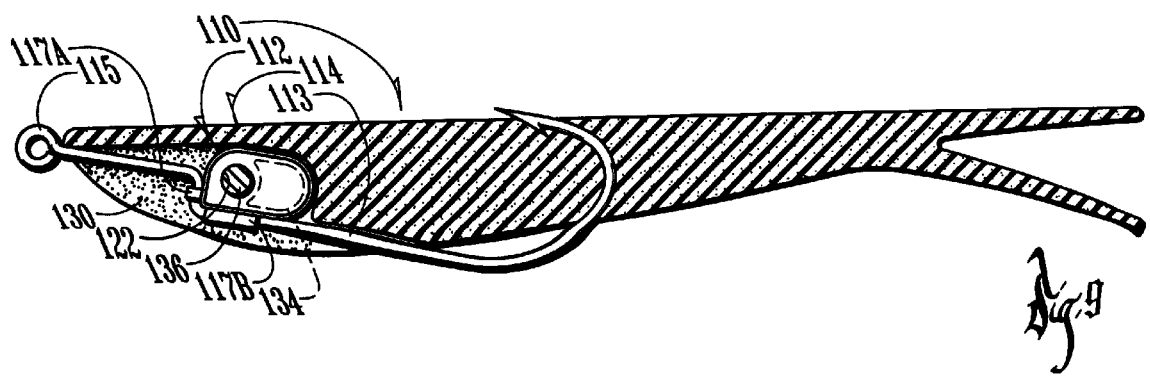
FIG. 9 is a sectional view taken along line 9—9 of FIG. 7.

FIGS. 7–9 show an alternate embodiment of the present invention. FIG. 7 is a perspective view of a jerk bait fishing lure 110 having a jig-style head. Much like the fishing lure 10 shown in FIG. 1, the jerk bait fishing lure 110 includes a soft outer body 114, and a pair of opposing eyes 118. The fishing lure 110 melds Rattlin' Jig single hook style baits with jerk style baits. The fishing lure 110 can be used with or without a weedless rigging.

As shown in FIG. 8, a hollow frame 112 includes an opening 122 which is adapted to receive eyes 118 much like the opening 22 shown in FIG. 2 receives the eyes 18. A hook assembly 113 can be snapped into place on the frame 112. In this way, hooks of differing sizes and styles can be snapped onto the frame 112. The hook 113 is held into place by two retainers 117A and 117B. The retainers 117A and 117B are preferably made from a cylindrical shaped piece of resilient plastic with slots formed in it to releasably hold the hook 113. FIG. 8 shows the hook 113 secured to the frame 112 (solid lines) and unsecured to the frame 112 (dashed lines). The hook assembly 113 includes an eye 115 which can be used to tie the hook 113 to a fishing line 20. FIG. 9 is a sectional view of the jerk bait fishing lure 110. As shown, the hollow frame 112 is substantially surrounded by a soft outer body 114 which, like the bodies 14, includes a slit 130 extending along the chin line from the eye 115 of the hook assembly 113 to the point where the hook 113 extends from the bottom of the body 114.

Like the fishing lure 10 described above, the soft outer body 114 is secured to the frame 112 by the removable eyes 118. The hook 113 is also inserted into the soft outer body 114. Even though the hook goes through the soft outer body 114, the body 114 is damaged less than with prior art lures. In this way, a plurality of soft outer bodies 114 can be used with the same frame 112 to provide a fisherman with a large variety of baits for the fishing lure 110. Like the hollow chamber 34 shown in FIG. 3, rattle members may also be used within the chamber 134 to provide a source of noise to attract fish, change the buoyancy of the lure, or to cause the lure to resonate at a desired frequency.

FIGS. 10–12 show an alternative embodiment of the present invention. FIG. 10 is a perspective view of a fishing lure 210 which, from its outer appearance, appears very similar to the lure 10 shown in FIG. 1. The fishing lure 210 includes a solid frame 212 which may be made from any suitable material including, but not limited to wood, cork or plastic. The lure 210 also includes a soft outer body 214 disposed substantially around the hard frame substrate 212. The outer body 214 may be comprised of soft plastic or a semi-rigid plastic. The outer body 214 includes eyes 218 which are formed in the body 214 rather than being separate members like the eyes 18 shown in FIG. 1.

FIG. 11 is a sectional view of the fishing lure 210 shown in FIG. 10. As shown, the frame 212 is surrounded by the outer body 214. Like the body 14 shown in FIG. 1, the body 214 includes a slot 230 formed along its lower side for allowing the body 214 to be slid over and around the frame 212. One or more hooks 216 are secured to the lure 210 by screw eyes 215 which are threaded into the hard frame 212. Note that the hooks can be secured to the frame 212 in any number of ways. In addition, the hooks 216 are shown as treble hooks but could be comprised of any type of hook. Like the body 14 shown in FIG. 3, the body 214 shown in FIGS. 10 and 11 includes a hollow chamber 232 which may be used to hold a scent or light emitting material. A weight could also be inserted into the chamber 232.

The outer body 214 of the lure 210 is secured to the frame 212 by a body retainer 234 which is best shown in FIG. 12. The body retainer protrudes from the body 212 and includes a shaft portion 236 and a pointed barbed portion 238. The body 214 is secured to the frame 212 by inserting the body retainer 234 into the body 214. The opening in the body 214 in which the body retainer 234 is inserted, can be formed by the body retainer 234 itself or may be preformed.

The soft plastic bodies 14, 114, and 214, may also be secured to their respective frame by various alternative methods. For example, the bodies could be secured by gluing, Velcro, adhesive tape, etc. Alternatively, the soft bodies could be secured to the frame with no protrusion or fastener. In such an embodiment, the body could be secured simply by the fact that if conforms to the frame and the resiliancy of the body itself hold it to the frame.

The present invention operates as follows. A fisherman using the present invention will preferably have a tacklebox with at least the following items: one or more frames 10 or 212; a plurality of soft outer bodies 14 or 214 having various colors, shapes, and other characteristics; a plurality of eyes 18; and a number of lips 40. The fisherman may optionally have one or more of the following: a jerk bait frame 112; a number of jerk bait hooks 113 of various sizes; and a plurality of jerk bait soft outer bodies 114 having various shapes, sizes, and colors, etc.

The fisherman will initially tie a frame assembly 12 to the fishing line 20 in a conventional manner. Alternatively, if the fisherman wishes to fish with a jerk type bait, the hook and frame assembly 112 will be tied to the fishing line 20. Of course, the frames can include many types in addition to that shown in the Figures. For example, a 3-hook frame may be used. The fisherman then decides what type of bait would be best for the given situation. Depending on the type of bait desired, the fisherman will select a soft outer body 14 from the plurality of bodies 14 found in the tackle box. The fisherman will also select a pair of eyes 18 which have a color and or weight which the fisherman desires for the situation.

The eyes 18 can then be inserted into the eye sockets 22 of the frame 12 if the eyes 18 are not already inserted. The selected soft outer body 14 can then be inserted around the frame 12 by pushing the frame 12 through the slot 30 so that the body 14 closely conforms to the frame 12 (FIG. 3). To secure the body 14 to the frame 12, the body 14 can be pressed in the proximity of the eyes 18 so that the head portion 38 of the eyes 18 will extend through the holes 28 formed in the bodies 12 (FIG. 4). In this way, the eyes 18 will now secure the soft outer body 14 to the frame 12. The fisherman can then use the lure 10 in a conventional manner.

The fisherman may also decide to use a lip 40 in order to make the lure 10 a lipped bait which will cause the lure 10 to act in a different manner, for example act as a diving lure. To insert the lip 40, the user aligns the legs 42 of the lip 40 with the cavity 46 formed in the frame 12 (FIG. 6). By pressing the lip 40 into the cavity, the legs 42 will flex and cause the protrusions 44 to be secured within the cavity 46 by the fingers 48. The lip 40 can be removed from the frame 12 by simply pulling the lip 40 from the frame 12. The lip 40 could also be permanent.

The fisherman may also choose to insert a scent emitting material or light emitting material into the hollow cavity 32 formed in the soft outer body 14 (FIG. 3). The user may also wish to use a frame 12 that includes rattling members such as spherical balls within the hollow chamber 34 formed in the frame 12. This will give the lure 10 a rattling sound as it moves through the water. If the user wishes the lure 10 to sink or sink at a faster rate, a weight can also be placed within the hollow chamber 32 formed in the body 14. Alternatively, the eyes 18 could be made of metal to add weight, or could be made buoyant to change the action of the lure.

When the fisherman desires to change to a different type of lure, the fishing line 20 does not have to be untied from the wire form 24. For example, to change eye colors, the eyes 18 can be pulled out of the frame 12 and a different set of eyes 18 inserted into the eye sockets 22 of the frame 12. If a different body style or body color is desired, the body 14 can be removed from the frame 12 by pulling up on the body 14 in the proximity of the eyes 18 to pull the opening 28 from the eyes 18 so that the remainder of the body 14 can be removed from the frame 12. Likewise, the lip 40 can be inserted or removed to change lure types.

The jerk style bait shown in FIGS. 7–9 operates in a similar manner. It can be seen that using a lure of the present invention allows a fisherman to interchange all popular body styles without retying the fishing line. In addition, the present invention allows a fisherman to convert between floating, sinking, or suspending bait without untying the fishing line.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A fishing lure comprising:

a frame;

first and second eyes extending from the frame, the first and second eyes each being comprised of a shaft having an enlarged end;

a removable soft outer body adapted to fit over at least a portion of the frame and forming a bait portion of the fishing lure, the outer body being attachable to the frame by said eyes while being removable without removing said eyes; and first and second openings fittable over the first and second eyes formed in the removable soft outer body in locations corresponding to the locations of the first and second eyes when the removable soft outer body is fitted over the frame, wherein the enlarged ends of the first and second eyes fit and at least partially extend through the first and second openings, respectively, to secure the removable soft outer body to the frame.

2. The fishing lure of claim 1 wherein the eyes are removably secured to the frame.

3. The fishing lure of claim 2 further comprising first and second openings formed in the frame, wherein the first and second openings are adapted to receive the shaft of the first and second eyes, respectively.

4. The fishing lure of claim 1 wherein the frame is hollow.

5. The fishing lure of claim 4 further comprising a plurality of rattling members disposed within the hollow frame.

6. The fishing lure of claim 1 further comprising a wire frame coupled to the frame and being adapted to be attached to a fishing line and at least one hook.

7. The fishing lure of claim 1 further comprising a lip coupled to the frame for changing the performance of the lure.

8. The fishing lure of claim 1 further comprising a cavity formed in the soft outer body.

9. The fishing lure of claim 8 further comprising a scent emitting material disposed within the cavity.

10. The fishing lure of claim 8 further comprising a light emitting material disposed within the cavity.

* * * * *